United States Patent
Yu (12) United States Patent (10) Patent No.: US 12,470,893 B2
(45) Date of Patent: Nov. 11, 2025

(54) UNMANNED AERIAL VEHICLE CONTROL METHOD AND DEVICE, AND STORAGE MEDIUM

(71) Applicant: JRD Communication (Shenzhen) LTD., Shenzhen (CN)

(72) Inventor: Longjie Yu, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 891 days.

(21) Appl. No.: 17/617,587

(22) PCT Filed: Dec. 18, 2019

(86) PCT No.: PCT/CN2019/126132
§ 371 (c)(1),
(2) Date: Dec. 9, 2021

(87) PCT Pub. No.: WO2021/097979
PCT Pub. Date: May 27, 2021

(65) Prior Publication Data
US 2022/0248181 A1 Aug. 4, 2022

(30) Foreign Application Priority Data
Nov. 18, 2019 (CN) .......................... 201911127922.8

(51) Int. Cl.
*H04W 4/029* (2018.01)
*G05D 1/00* (2024.01)
(Continued)

(52) U.S. Cl.
CPC ............ *H04W 4/029* (2018.02); *G05D 1/104* (2013.01); *H04W 8/005* (2013.01); *H04W 76/10* (2018.02);
(Continued)

(58) Field of Classification Search
CPC ..... H04W 4/029; H04W 76/10; H04W 84/06; H04W 8/005; G05D 1/104; B64U 2101/20
(Continued)

(56) References Cited

U.S. PATENT DOCUMENTS 8,897,770 B1  11/2014 Frolov et al.
10,866,596 B1  12/2020 Shattil
(Continued)

FOREIGN PATENT DOCUMENTS

CN  104750103  7/2015
CN  105245846  1/2016
(Continued)

OTHER PUBLICATIONS

Notification of Office Action and Search Report Dated Nov. 6, 2020 From the State Intellectual Property Office of the People's Republic of China Re. Application No. 201911127922.8 and Its Translation of Office Action Into English. (18 Pages).
(Continued)

*Primary Examiner* — William Nealon (57) ABSTRACT

An unmanned aerial vehicle control method and device, and a storage medium. The method comprises: when a first beacon frame sent by a sender is scanned, feeding a first access request back to the sender; sending a second beacon frame to detect whether a first unmanned aerial vehicle which feeds back a second access request according to the second beacon frame exists; if the first unmanned aerial vehicle exists, feeding back confirmation information according to the second beacon frame; and upon receipt of an action instruction sent by the sender, sending the action instruction to the first unmanned aerial vehicle.

18 Claims, 4 Drawing Sheets

(51) Int. Cl.
*H04W 8/00* (2009.01)
*H04W 76/10* (2018.01)
*H04W 84/06* (2009.01)
*B64U 101/20* (2023.01)

(52) U.S. Cl.
CPC ......... *B64U 2101/20* (2023.01); *H04W 84/06* (2013.01)

(58) Field of Classification Search
USPC ....................................................... 455/456.1
See application file for complete search history.

(56) References Cited

U.S. PATENT DOCUMENTS

| | | | |
|---|---|---|---|
| 2012/0182926 A1 | 7/2012 | Yu et al. | |
| 2017/0238234 A1* | 8/2017 | Dowlatkhah | H04W 48/16 455/517 |
| 2017/0243494 A1* | 8/2017 | Taveira | G05D 1/106 |
| 2018/0199210 A1* | 7/2018 | Zerick | H04W 24/04 |
| 2018/0319495 A1* | 11/2018 | Tu | H04B 7/18504 |
| 2018/0348748 A1* | 12/2018 | Dowlatkhah | G08G 5/0008 |
| 2022/0294524 A1* | 9/2022 | Miyakawa | H04N 7/185 |

FOREIGN PATENT DOCUMENTS

| | | |
|---|---|---|
| CN | 105357220 | 2/2016 |
| CN | 205017328 | 2/2016 |
| CN | 106656300 | 5/2017 |
| CN | 107831783 | 3/2018 |
| CN | 108073182 | 5/2018 |
| CN | 108349589 | 7/2018 |
| CN | 108700886 | 10/2018 |
| CN | 109104235 | 12/2018 |
| CN | 109151951 | 1/2019 |
| CN | 109257745 | 1/2019 |
| CN | 109819495 | 5/2019 |
| CN | 110234571 | 9/2019 |

OTHER PUBLICATIONS

Notification of Office Action and Search Report Dated Jun. 9, 2021 From the State Intellectual Property Office of the People's Republic of China Re. Application No. 201911127922.8 and Its Translation of Office Action Into English. (20 Pages).

International Search Report and the Written Opinion Dated Aug. 13, 2020 From the International Searching Authority Re. Application No. PCT/CN2019/126132. (9 Pages).

* cited by examiner

UNMANNED AERIAL VEHICLE CONTROL METHOD AND DEVICE, AND STORAGE MEDIUM

RELATED APPLICATIONS

This application is a National Phase of PCT Patent Application No. PCT/CN2019/126132 having International filing date of Dec. 18, 2019, which claims the benefit of priority of Chinese Patent Application No. 201911127922.8 filed on Nov. 18, 2019. The contents of the above applications are all incorporated by reference as if fully set forth herein in their entirety.

FIELD AND BACKGROUND OF THE INVENTION

The present application relates to communication technologies, and more particularly to an unmanned aerial vehicle (UAV) control method, device and storage medium.

In recent years, with development of technology and increasing of needs in people's work, UAVs or drones are attractive to users because they can reach the areas that users cannot reach. In express delivery industries, people have begun to use UAVs for automatic package delivery. By this way, manpower cost can be saved. In addition, in daily life, people use UAVs to take pictures or record videos at high altitudes to record beautiful scenery from an aerial perspective.

In relevant technologies, UAV communication solutions are based on a base station and a wireless network (WIFI). If it is based on the base station, the range of UAV communication would not be restricted by a geographical area as long as the area is covered by the base station. If it is based on WIFI, the range of UAV communication is within an area covered by 200 meters distanced from a ground WIFI master device. Therefore, if people use the UAV in the areas where there is no signal coverage by the base station, the range of UAV communication can only be within an area with a radius of 200 meters, taking the ground Wi-Fi master device as a center. The range of communication is greatly limited.

SUMMARY OF THE INVENTION

Embodiments of the present application provide a UAV control method, capable of increasing control range of UAVs by a ground master device.

In a first aspect, an embodiment of the present application provides a UAV control method, including:
  feeding back a first access request to a transmitting party based on a first beacon frame to establish a connection with the transmitting party when the first beacon frame sent by the transmitting party is obtained in a scan, wherein the transmitting party is a ground master device or another relay UAV;
  sending a second beacon frame and detecting whether a first UAV which feeds back a second access request based on the second beacon frame exists, wherein the first UAV is a UAV which has not established a connection with the transmitting party;
  if the first UAV which feeds back the second access request based on the second beacon frame exists, feeding back an acknowledgement based on the second beacon frame to enable a connection between the first UAV and the transmitting party; and
  after receiving an action instruction sent by the transmitting party, sending the action instruction to the first UAV to enable the first UAV to execute an action corresponding to the action instruction.

After the feeding back the first access request to the transmitting party based on the first beacon frame to establish the connection with the transmitting party, the method further comprises:
  detecting whether a second UAV which establishes a connection with the transmitting party exists;
  if the second UAV which establishes the connection with the transmitting party is detected, controlling the second UAV to obtain current spatial position information of the second UAV based on a predetermined period of time and to send the obtained spatial position information of the second UAV to the relay UAV.

After the feeding back the acknowledgement based on the second beacon frame, the method further comprises:
  controlling the first UAV to obtain current spatial position information of the first UAV based on a predetermined period of time and to send the obtained spatial position information of the first UAV to the relay UAV.

After the sending the obtained spatial position information of the first UAV to the relay UAV, the method further comprises:
  if a distance between the first UAV and the second UAV is detected to reach a first predetermined distance, controlling the first UAV and the second UAV to move toward each other.

After the sending the obtained spatial position information of the first UAV to the relay UAV, the method further comprises:
  if a distance between the first UAV and the second UAV that move toward each other reaches a second predetermined distance, controlling the first UAV and the second UAV to move opposite to each other.

In the UAV control method, the method further includes:
  if the first UAV malfunctions, sending geographic position information of the first UAV to the transmitting party.

In the UAV control method, before the detecting whether the second UAV which establishes the connection with the transmitting party exists, the method further comprises:
  receiving a synchronization beacon frame sent by the transmitting party to synchronize with a clock of the transmitting party.

In a second aspect, an embodiment of the present application provides a UAV control device, including:
  a first feedback unit, for feeding back a first access request to a transmitting party based on a first beacon frame to establish a connection with the transmitting party when the first beacon frame sent by the transmitting party is obtained in a scan, wherein the transmitting party is a ground master device or another relay UAV;
  a first detecting unit, for sending a second beacon frame and detecting whether a first UAV which feeds back a second access request based on the second beacon frame exists, wherein the first UAV is a UAV which has not established a connection with the transmitting party;
  a second feedback unit, feeding back, if the first UAV which feeds back the second access request based on the second beacon frame exists, an acknowledgement based on the second beacon frame to enable a connection between the first UAV and the transmitting party; and
  a sending unit, for sending, after receiving an action instruction sent by the transmitting party, the action instruction to the first UAV to enable the first UAV to execute an action corresponding to the action instruction.

In the UAV control device, the UAV control device further comprises:
a second detecting unit, for detecting whether a second UAV which establishes a connection with the transmitting party exists; and
a control unit, for controlling, if the second UAV which establishes the connection with the transmitting party is detected, the second UAV to obtain current spatial position information of the second UAV based on a predetermined period of time and to send the obtained spatial position information of the second UAV to the relay UAV.

In a third aspect, an embodiment of the present application provides a storage medium. The storage medium stores a computer program, and when the computer program runs on a computer, the computer executes a UAV control method. The UAV control method includes:
detecting whether a connection is established with another transmitting party when a first beacon frame sent by a transmitting party is obtained in a scan;
if a connection has been established with the another transmitting party, ignoring the first beacon frame;

If a connection is detected to be not established with the another transmitting party, feeding back a first access request to the transmitting party based on the first beacon frame to establish a connection with the transmitting party, wherein the transmitting party is a ground master device or another relay UAV;
sending a second beacon frame and detecting whether a first UAV which feeds back a second access request based on the second beacon frame exists, wherein the first UAV is a UAV which has not established a connection with the transmitting party;
if the first UAV which feeds back the second access request based on the second beacon frame exists, feeding back an acknowledgement based on the second beacon frame to enable a connection between the first UAV and the transmitting party; and
after receiving an action instruction sent by the transmitting party, sending the action instruction to the first UAV to enable the first UAV to execute an action corresponding to the action instruction.

In the storage medium, after the feeding back the first access request to the transmitting party based on the first beacon frame to establish the connection with the transmitting party, the method further comprises:
detecting whether a second UAV which establishes a connection with the transmitting party exists;
if the second UAV which establishes the connection with the transmitting party is detected, controlling the second UAV to obtain current spatial position information of the second UAV based on a predetermined period of time and to send the obtained spatial position information of the second UAV to the relay UAV.

In the storage medium, after the feeding back the acknowledgement based on the second beacon frame, the method further comprises:
controlling the first UAV to obtain current spatial position information of the first UAV based on a predetermined period of time and to send the obtained spatial position information of the first UAV to the relay UAV.

In the storage medium, after the sending the obtained spatial position information of the first UAV to the relay UAV, the method further comprises:

if a distance between the first UAV and the second UAV is detected to reach a first predetermined distance, controlling the first UAV and the second UAV to move toward each other.

In the storage medium, after the sending the obtained spatial position information of the first UAV to the relay UAV, the method further comprises:
if a distance between the first UAV and the second UAV that move toward each other reaches a second predetermined distance, controlling the first UAV and the second UAV to move opposite to each other.

In the storage medium, the method further includes:
if the first UAV malfunctions, sending geographic position information of the first UAV to the transmitting party.

In the storage medium, before the detecting whether the second UAV which establishes the connection with the transmitting party exists, the method further comprises:
receiving a synchronization beacon frame sent by the transmitting party to synchronize with a clock of the transmitting party.

Beneficial Effects

The embodiments of the present application provide a UAV control method, which includes feeding back a first access request to a transmitting party based on a first beacon frame to establish a connection with the transmitting party when the first beacon frame sent by the transmitting party is obtained in a scan, wherein the transmitting party is a ground master device or another relay UAV; sending a second beacon frame and detecting whether a first UAV which feeds back a second access request based on the second beacon frame exists, wherein the first UAV is a UAV which has not established a connection with the transmitting party; if the first UAV which feeds back the second access request based on the second beacon frame exists, feeding back an acknowledgement based on the second beacon frame to enable a connection between the first UAV and the transmitting party; and after receiving an action instruction sent by the transmitting party, sending the action instruction to the first UAV to enable the first UAV to execute an action corresponding to the action instruction. In such a way, it can increase control range of UAVs by the ground master device.

BRIEF DESCRIPTION OF THE SEVERAL VIEWS OF THE DRAWINGS

For explaining the technical solutions used in the embodiments of the present application more clearly, the appended figures to be used in describing the embodiments will be briefly introduced in the following. Obviously, the appended figures described below are only some of the embodiments of the present application, and those of ordinary skill in the art can further obtain other figures according to these figures without making any inventive effort.

DESCRIPTION OF SPECIFIC EMBODIMENTS OF THE INVENTION

The technical solutions in the embodiments of the present application will be clearly and completely described below with reference to appended drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope the present application.

Figure 1:
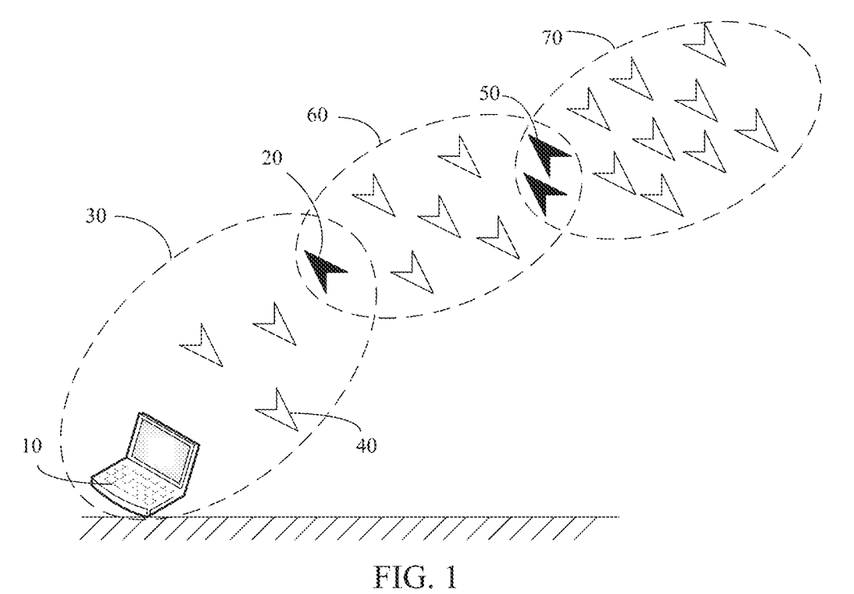
FIG. 1 is a schematic diagram showing a scenario to which a UAV control system applies in an embodiment of the present application.

Referring to FIG. 1, an embodiment of the present application provides an unmanned aerial vehicle (UAV) control system, which includes a ground master device 10, a first relay UAV 20, and a first group 30 consisting of the ground master device 10 and the first relay UAV 20, wherein the first group 30 may also have a plurality of operating UAVs 40; a second group 60 formed by the first relay UAV 20 and a second relay UAV 50, and a third group 70 formed by the second relay UAV 50 alone, wherein the second group 60 and the third group 70 may have a plurality of operating UAVs 40, likewise. The ground master device 10 can be a mobile phone, a tablet computer, a notebook computer, etc. FIG. 1 is illustrated by tanking a notebook computer as the ground master device 10. Various applications required by users may be installed in the ground master device 10. These applications are such as applications with entertainment functions (e.g., video applications, audio playback applications, game applications, reading software, etc.), and applications with service functions (e.g., navigation applications, catering applications, etc.)

Figure 2:
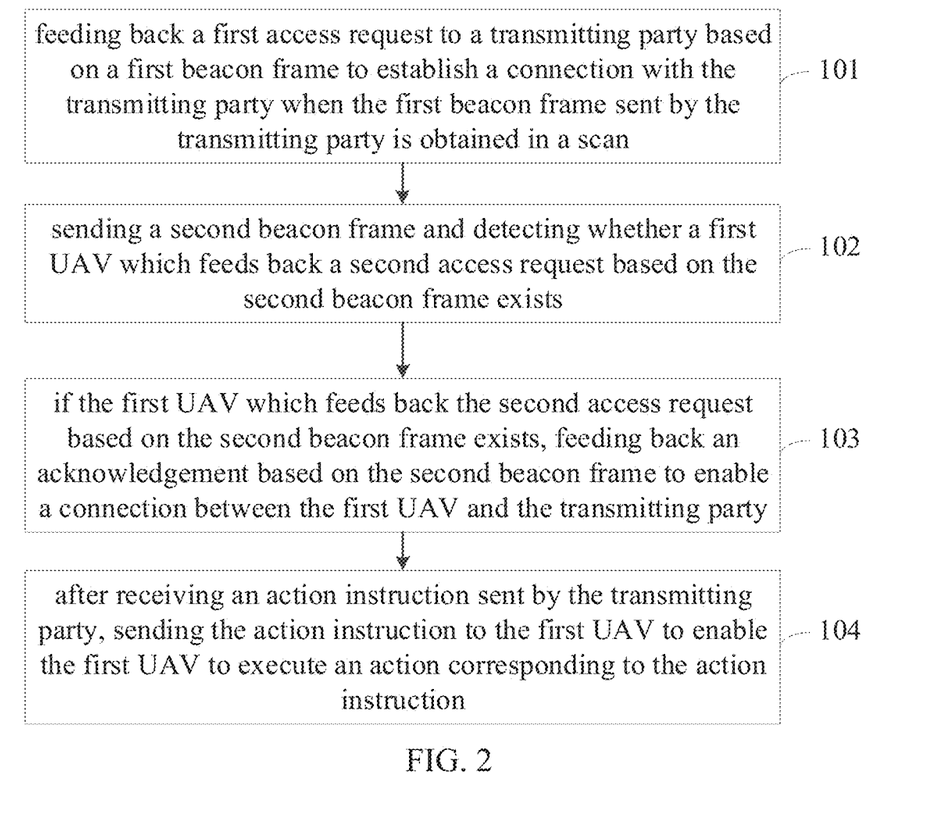
FIG. 2 is a first flowchart of a UAV control method provided in an embodiment of the present application.

Based on the system shown in FIG. 1 described above, an embodiment of the application provides a UAV control method for implementing the described UAV control system, wherein the method is applied to a relay UAV. Please refer to FIG. 2 for details. FIG. 2 is a flowchart of a UAV control method provided in an embodiment of the present application. The method includes the following steps:

Step 101: feeding back a first access request to a transmitting party based on a first beacon frame to establish a connection with the transmitting party when the first beacon frame sent by the transmitting party is obtained in a scan.

Specifically, the ground master device is taken as the transmitting party for example. In a phase of establishing the groups, the ground master device will release a first beacon frame to look for or determine whether a controllable UAV exists within a predetermined control range. Accordingly, the first beacon frame is a discovery beacon frame used for discovering a UAV within the predetermined control range.

When receiving the first beacon frame sent by the transmitting party, whether a connection is established with another transmitting party may be detected or determined in advance. Accordingly, when the first beacon frame sent by the transmitting party is obtained in a scan, the method may further include:

detecting whether a connection is established with another transmitting party;
if a connection has been established with the another transmitting party, ignoring the first beacon frame.

If a connection is detected to be not established with the another transmitting party, it indicates that a connection can be established with the transmitting party, and thus a first access request is fed back to the transmitting party based on the first beacon frame. After the transmitting party receives the first access request, a connection is established with the transmitting party as long as the request is granted.

The transmitting party is not limited to the ground master device. It can also be other relay UAVs. When the transmitting party is the ground master device, what is established is the first group 30 shown in FIG. 1. When the transmitting party is another relay UAV, what is established is the second group 60 or the third group 70 shown in FIG. 1.

After establishing a connection with the transmitting party, whether an operating UAV which also establishes a connection with the transmitting party exists may be detected or determined in advance. If yes, a second UAV may be controlled to obtain its current spatial position information based on a predetermined period of time and the spatial position information of the second UAV is received. In order to avoid interferences with the second UAV, the second UAV may be controlled to execute corresponding anti-collision or anti-disconnection actions. In the presence of a plurality of second UAVs, when the plurality of second UAVs are detected to be close to each other or away from each other, the aforesaid actions may be executed. Accordingly, after the feeding back the first access request to the transmitting party based on the first beacon frame to establish the connection with the transmitting party, the method further comprises:

detecting whether a second UAV which establishes a connection with the transmitting party exists;
if the second UAV which establishes the connection with the transmitting party is detected, controlling the second UAV to obtain current spatial position information of the second UAV based on a predetermined period of time and to send the obtained spatial position information of the second UAV to the relay UAV.

Before the detecting whether the second UAV which establishes the connection with the transmitting party exists, the method further includes:

receiving a synchronization beacon frame sent by the transmitting party to synchronize with a clock of the transmitting party. In such a way, power consumption of the group is reduced.

Step 102: sending a second beacon frame to detect whether a first UAV which feeds back a second access request based on the second beacon frame exists.

Specifically, after a connection is established with the transmitting party, a second beacon frame will be automatically sent to look for or determine whether an operating UAV which has not established a connection with the transmitting party exists within a predetermined control range. A way to detect this can be to send the second beacon frame to detect whether there is an operating UAV that feeds back an access request based on the second beacon frame.

The second beacon frame and the first beacon frame are of a same type, and both of them are discovery beacon frames for discovering UAVs within the predetermined control range that have not established a connection with the transmitting party.

Step 103: if the first UAV which feeds back the second access request based on the second beacon frame exists, feeding back an acknowledgement based on the second beacon frame to enable a connection between the first UAV and the transmitting party When the second access request is received, a connection can be established with the transmitting party as long as the request is granted.

After establishing a connection between the first UAV and the transmitting party, a first UAV may be controlled to obtain its current spatial position information based on a predetermined period of time and the spatial position information of the first UAV is received. In order to avoid interferences with the first UAV, the first UAV may be controlled to execute corresponding anti-collision or anti-disconnection actions. In the presence of a plurality of first UAVs, when the plurality of first UAVs are detected to be close to each other or away from each other, the aforesaid actions may be executed. Accordingly, after the acknowledgement is fed back based on the second beacon frame, the method further includes:

controlling the first UAV to obtain current spatial position information of the first UAV based on a predetermined period of time and to send the obtained spatial position information of the first UAV to the relay UAV.

When the first UAV malfunctions, geographic position information of the first UAV may be sent to the transmitting party to notify a user which UAV malfunctions and where it lands.

After a connection is established between the first UAV and the transmitting party, the relay UAV is in an overlapping area of the two groups such that it can control the UAVs (the first UAV and the second UAV) of the two groups. Accordingly, after the current spatial position information of the first UAV and the current spatial position information of the second UAV are obtained at the same time, the relay UAV can monitor the UAVs in the two groups in real time. When it is detected that the first UAV and the second UAV are away from each other and it may be easy to lose the connection, the first UAV and the second UAV that are away from each other may be controlled to move toward each other. Accordingly, after the obtained spatial position information of the first UAV is sent to the relay UAV, the method further includes:

if a distance between the first UAV and the second UAV is detected to reach a first predetermined distance, controlling the first UAV and the second UAV to move toward each other.

Likewise, when it is detected that the first UAV and the second UAV are close to each other and collisions are prone to occur, the first UAV and the second UAV that are close to each other can be controlled to move opposite to each other. Accordingly, after the obtained geographic position information and altitude information of the first UAV is sent to the relay UAV, the method further includes:

if a distance between the first UAV and the second UAV that move toward each other reaches a second predetermined distance, controlling the first UAV and the second UAV to move opposite to each other.

Specifically, the spatial position information may include current longitude, latitude, and altitude of the first UAV and the second UAV. The longitude, latitude and altitude form a three-dimensional space. If it is in a four-dimensional or five-dimensional space, other information may also be included but it is not limited herein. The altitude can be measured by an air pressure sensor carried on the UAV.

The information carried on the discovery beacon frames may be used to determine which UAV has problems, as shown in Tables 1 and 2. Table 1 shows the information carried on the discovery beacon frames provided in an embodiment of the present application. Table 2 shows attribute types.

TABLE 1

| Frame content | Category | Action Field | OUI | OUI Type | Attributes |
|---|---|---|---|---|---|
| Value | 0x04 | 0x09 | 0x50-6F-9A | 0x13 | var. |
| Bytes | 1 | 1 | 3 | 1 | var. |

TABLE 2

| | Service description | Manufacturer-specific attributes | | | |
|---|---|---|---|---|---|
| Attributes | attributes | Attribute ID | Length | OUI | Body |
| Value | | 0xDD | x + 3 | | |
| Bytes | 12 | 1 | 2 | 3 | x |

Category indicates that the type of the frame is Public Action Frame; Action Field indicates that the Public Action Frame is relevant to a specific manufacturer; OUI refers to Organizationally Unique Identifier; OUI Type refers to the type of OUI; Attributes refers to attributes that include service description attributes and manufacturer-specific attributes. For the manufacturer-specific attributes, Attribute ID refers to a manufacturer-specific attribute number; Length refers to the length of OUI and Body; OUI refers to manufacturer's number; Body refers to the manufacturer's specific information.

In some embodiments, Table 1 and Table 2 can also be simplified into Table 3.

TABLE 3

| | | Body | |
|---|---|---|---|
| Frame content | Message ID | Message content | |
| Value | | | |
| Bytes | 1 | | |

The message ID may include 0x01 used for a UAV to send its own position information; 0x02 used for a relay UAV to broadcast a list of positions of all UAVs; 0x03 used for a ground master device to send an instruction to an operating UAV; 0x04 used for an operating UAV to send a feedback to the ground master device; and 0x05 used for a UAV to send emergency messages when malfunctioned.

Referring to Table 4, the spatial position information of a UAV is taken as the message content for example.

TABLE 4

| | | Body | | | | | | | | |
|---|---|---|---|---|---|---|---|---|---|---|
| Frame content | Message ID | Interface address of UAV 1 | Longitude 1 | Latitude 1 | Altitude 1 | ... | Interface address of UAV k | Longitude k | Latitude k | Altitude k ... |
| Value | 0x02 | | | | ... | | | | | ... |
| Bytes | 1 | | | | ... | | | | | ... |

The interface address of UAV may uniquely represent a specific UAV, and thus real-time sharing of position information of all UAVs is realized.

Step 104: after receiving an action instruction sent by the transmitting party, sending the action instruction to the first UAV to enable the first UAV to execute an action corresponding to the action instruction.

After the ground master device sends an action instruction, the action instruction will pass down stage by stage. Taking the UAV groups set up in FIG. 1 as an example, after the ground master device sends an action instruction, the operating UAVs 40 and the relay UAV 20 of the first group 30 will execute an action corresponding to the action instruction, and the relay UAV 20 will send the action instruction to all UAVs of the second group 60. After the relay UAV 50 receives the action instruction, it will send the action instruction to all UAVs of the third group 70. In such a way, expansion of control range of the ground master device is realized.

The embodiments of the present application provide a UAV control method, which includes feeding back a first access request to a transmitting party based on a first beacon frame to establish a connection with the transmitting party when the first beacon frame sent by the transmitting party is obtained in a scan, wherein the transmitting party is a ground master device or another relay UAV; sending a second beacon frame and detecting whether a first UAV which feeds back a second access request based on the second beacon frame exists, wherein the first UAV is a UAV which has not established a connection with the transmitting party; if the first UAV which feeds back the second access request based on the second beacon frame exists, feeding back an acknowledgement based on the second beacon frame to enable a connection between the first UAV and the transmitting party; and after receiving an action instruction sent by the transmitting party, sending the action instruction to the first UAV to enable the first UAV to execute an action corresponding to the action instruction. In such a way, it can increase control range of UAVs by the ground master device.

Figure 3:
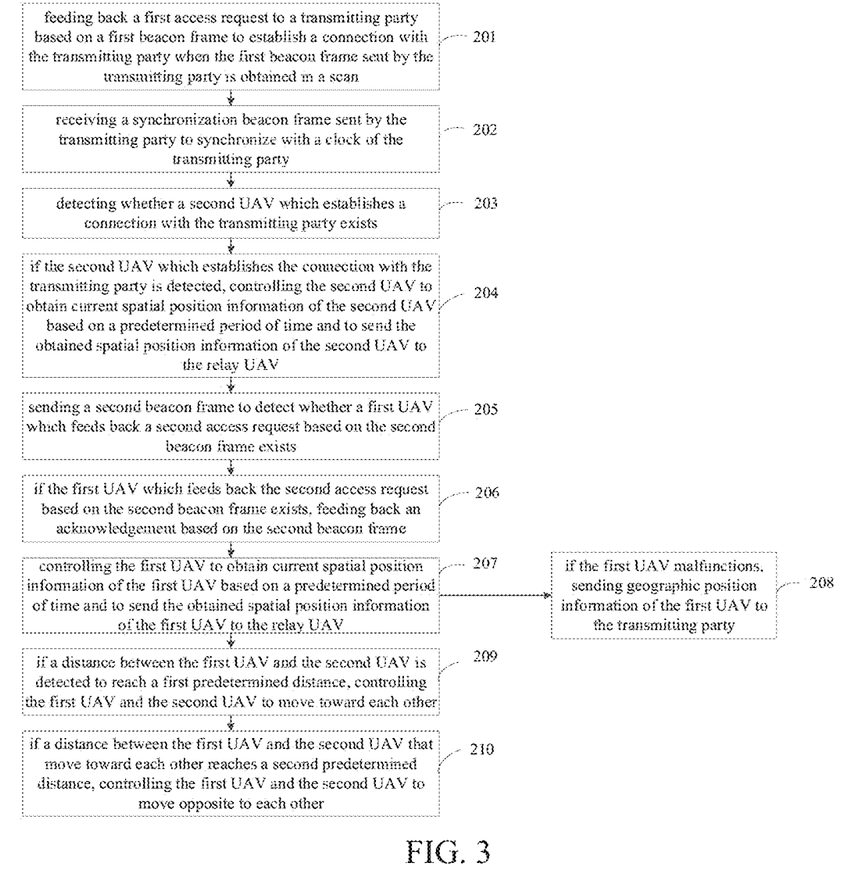
FIG. 3 is a second flowchart of a UAV control method provided in an embodiment of the present application.

FIG. 3 is a second flowchart of a UAV control method provided in an embodiment of the present application. The method includes the following steps:

Step 201: feeding back a first access request to a transmitting party based on a first beacon frame to establish a connection with the transmitting party when the first beacon frame sent by the transmitting party is obtained in a scan.

Specifically, the ground master device is taken as the transmitting party for example. In a phase of establishing the groups, the ground master device will release a first beacon frame to look for or determine whether a controllable UAV exists within a predetermined control range. Accordingly, the first beacon frame is a discovery beacon frame used for discovering a UAV within the predetermined control range.

When receiving the first beacon frame sent by the transmitting party, whether a connection is established with another transmitting party may be detected or determined in advance. Accordingly, when the first beacon frame sent by the transmitting party is obtained in a scan, the method may further include:

detecting whether a connection is established with another transmitting party;

if a connection has been established with the another transmitting party, ignoring the first beacon frame.

If a connection is detected to be not established with the another transmitting party, it indicates that a connection can be established with the transmitting party, and thus a first access request is fed back to the transmitting party based on the first beacon frame. After the transmitting party receives the first access request, a connection is established with the transmitting party as long as the request is granted.

Step 202: receiving a synchronization beacon frame sent by the transmitting party to synchronize with a clock of the transmitting party.

Specifically, the transmitting party may send a synchronization beacon frame, and the relay UAV or the operating UAV may receive the synchronization beacon frame sent by the transmitting party to synchronize with a clock of the transmitting party. In such a way, power consumption of the group is reduced.

Step S203: detecting whether a second UAV which establishes a connection with the transmitting party exists.

Specifically, after establishing a connection with the transmitting party, whether an operating UAV which also establishes a connection with the transmitting party exists may be detected or determined in advance. If yes, a second UAV may be controlled to obtain its current spatial position information based on a predetermined period of time and the spatial position information of the second UAV is received. In order to avoid interferences with the second UAV, the second UAV may be controlled to execute corresponding anti-collision or anti-disconnection actions. In the presence of a plurality of second UAVs, when the plurality of second UAVs are detected to be close to each other or away from each other, the aforesaid actions may be executed.

Step 204: if the second UAV which establishes the connection with the transmitting party is detected, controlling the second UAV to obtain current spatial position information of the second UAV based on a predetermined period of time and to send the obtained spatial position information of the second UAV to the relay UAV.

Step 205: sending a second beacon frame to detect whether a first UAV which feeds back a second access request based on the second beacon frame exists.

Specifically, after a connection is established with the transmitting party, a second beacon frame will be automatically sent to look for or determine whether an operating UAV which has not established a connection with the transmitting party exists within a predetermined control range. A way to detect this can be to send the second beacon frame to detect whether there is an operating UAV that feeds back an access request based on the second beacon frame.

The second beacon frame and the first beacon frame are of a same type, and both of them are discovery beacon frames for discovering UAVs within the predetermined control range that have not established a connection with the transmitting party.

Step 206: if the first UAV which feeds back the second access request based on the second beacon frame exists, feeding back an acknowledgement based on the second beacon frame.

When the second access request is received, a connection can be established with the transmitting party as long as the request is granted.

Step 207: controlling the first UAV to obtain current spatial position information of the first UAV based on a predetermined period of time and to send the obtained spatial position information of the first UAV to the relay UAV.

Specifically, after establishing a connection between the first UAV and the transmitting party, the first UAV may be controlled to obtain its current spatial position information based on a predetermined period of time and the spatial position information of the first UAV is received. In order to avoid interferences with the first UAV, the first UAV may be controlled to execute corresponding anti-collision or anti-disconnection actions. In the presence of a plurality of first UAVs, when the plurality of first UAVs are detected to be close to each other or away from each other, the aforesaid actions may be executed.

Step 208: if the first UAV malfunctions, sending geographic position information of the first UAV to the transmitting party.

Specifically, when the first UAV malfunctions, geographic position information of the first UAV may be sent to the transmitting party to notify a user which UAV malfunctions and where it lands.

Step 209: if a distance between the first UAV and the second UAV is detected to reach a first predetermined distance, controlling the first UAV and the second UAV to move toward each other.

After a connection is established between the first UAV and the transmitting party, the relay UAV is in an overlapping area of the two groups such that it can control the UAVs (the first UAV and the second UAV) of the two groups. Accordingly, after the current spatial position information of the first UAV and the current spatial position information of the second UAV are obtained at the same time, the relay UAV can monitor the UAVs in the two groups in real time. When it is detected that the first UAV and the second UAV are away from each other and it may be easy to lose the connection, the first UAV and the second UAV that are away from each other may be controlled to move toward each other.

Step 210: if a distance between the first UAV and the second UAV that move toward each other reaches a second predetermined distance, controlling the first UAV and the second UAV to move opposite to each other.

The embodiments of the present application provide a UAV control method, which includes feeding back a first access request to a transmitting party based on a first beacon frame to establish a connection with the transmitting party when the first beacon frame sent by the transmitting party is obtained in a scan, wherein the transmitting party is a ground master device or another relay UAV; sending a second beacon frame and detecting whether a first UAV which feeds back a second access request based on the second beacon frame exists, wherein the first UAV is a UAV which has not established a connection with the transmitting party; if the first UAV which feeds back the second access request based on the second beacon frame exists, feeding back an acknowledgement based on the second beacon frame to enable a connection between the first UAV and the transmitting party; and after receiving an action instruction sent by the transmitting party, sending the action instruction to the first UAV to enable the first UAV to execute an action corresponding to the action instruction. In such a way, it can increase control range of UAVs by the ground master device.

Figure 4:
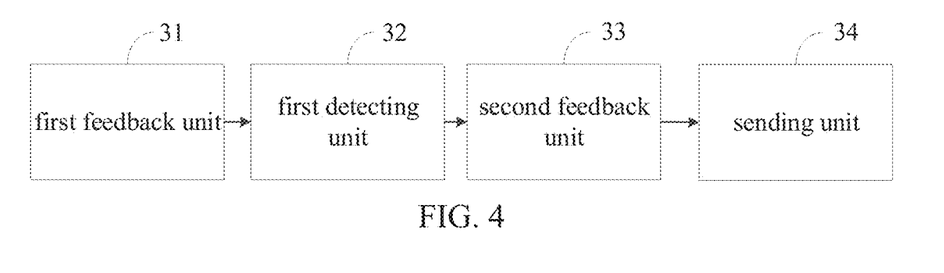
FIG. 4 is a structural schematic diagram showing a UAV control device provided in an embodiment of the present application.

FIG. 4 is a structural schematic diagram showing a UAV control device provided in an embodiment of the present application. The UAV control device includes a first feedback unit 31, a first detecting unit 32, a second feedback unit 33 and a sending unit 34.

The first feedback unit 31 is configured for feeding back a first access request to a transmitting party based on a first beacon frame to establish a connection with the transmitting party when the first beacon frame sent by the transmitting party is obtained in a scan, wherein the transmitting party is a ground master device or another relay UAV.

Specifically, the ground master device is taken as the transmitting party for example. In a phase of establishing the groups, the ground master device will release a first beacon frame to look for or determine whether a controllable UAV exists within a predetermined control range. Accordingly, the first beacon frame is a discovery beacon frame used for discovering a UAV within the predetermined control range.

The first detecting unit is configured for sending a second beacon frame and detecting whether a first UAV which feeds back a second access request based on the second beacon frame exists, wherein the first UAV is a UAV which has not established a connection with the transmitting party.

Specifically, after a connection is established with the transmitting party, a second beacon frame will be automatically sent to look for or determine whether an operating UAV which has not established a connection with the transmitting party exists within a predetermined control range. A way to detect this can be to send the second beacon frame to detect whether there is an operating UAV that feeds back an access request based on the second beacon frame.

The second beacon frame and the first beacon frame are of a same type, and both of them are discovery beacon frames for discovering UAVs within the predetermined control range that have not established a connection with the transmitting party.

The second feedback unit 33 is configured for feeding back, if the first UAV which feeds back the second access request based on the second beacon frame exists, an acknowledgement based on the second beacon frame to enable a connection between the first UAV and the transmitting party.

When the second access request is received, a connection can be established with the transmitting party as long as the request is granted.

The sending unit 34 is configured for sending, after receiving an action instruction sent by the transmitting party, the action instruction to the first UAV to enable the first UAV to execute an action corresponding to the action instruction.

After the ground master device sends an action instruction, the action instruction will pass down stage by stage. Taking the UAV groups set up in FIG. 1 as an example, after the ground master device sends an action instruction, the operating UAVs 40 and the relay UAV 20 of the first group 30 will execute an action corresponding to the action instruction, and the relay UAV 20 will send the action instruction to all UAVs of the second group 60. After the relay UAV 50 receives the action instruction, it will send the action instruction to all UAVs of the third group 70. In such a way, expansion of control range of the ground master device is realized.

In some embodiments, the UAV control device may further include:
 a second detecting unit, for detecting whether a second UAV which establishes a connection with the transmitting party exists; and
 a control sub unit, for controlling, if the second UAV which establishes the connection with the transmitting party is detected, the second UAV to obtain current spatial position information of the second UAV based on a predetermined period of time and to send the obtained spatial position information of the second UAV to the relay UAV.

In some embodiments, the UAV control device may further include:
 a spatial position information sending unit, for controlling the first UAV to obtain current spatial position information of the first UAV based on a predetermined period of time and to send the obtained spatial position information of the first UAV to the relay UAV.

In some embodiments, the UAV control device may further include:
a first detection control unit, for controlling the first UAV and the second UAV to move toward each other if a distance between the first UAV and the second UAV is detected to reach a first predetermined distance.

In some embodiments, the UAV control device may further include:
a second detection control unit, for controlling the first UAV and the second UAV to move opposite to each other if a distance between the first UAV and the second UAV that move toward each other reaches a second predetermined distance.

An embodiment of the present application provides a storage medium. The storage medium stores a computer program, and when the computer program runs on a computer, the computer executes a UAV control method. The UAV control method includes:
detecting whether a connection is established with another transmitting party when a first beacon frame sent by a transmitting party is obtained in a scan;
if a connection has been established with the another transmitting party, ignoring the first beacon frame;
If a connection is detected to be not established with the another transmitting party, feeding back a first access request to the transmitting party based on the first beacon frame to establish a connection with the transmitting party, wherein the transmitting party is a ground master device or another relay UAV;
sending a second beacon frame and detecting whether a first UAV which feeds back a second access request based on the second beacon frame exists, wherein the first UAV is a UAV which has not established a connection with the transmitting party;
if the first UAV which feeds back the second access request based on the second beacon frame exists, feeding back an acknowledgement based on the second beacon frame to enable a connection between the first UAV and the transmitting party; and
after receiving an action instruction sent by the transmitting party, sending the action instruction to the first UAV to enable the first UAV to execute an action corresponding to the action instruction.

After the feeding back the first access request to the transmitting party based on the first beacon frame to establish the connection with the transmitting party, the method further includes:
detecting whether a second UAV which establishes a connection with the transmitting party exists;
if the second UAV which establishes the connection with the transmitting party is detected, controlling the second UAV to obtain current spatial position information of the second UAV based on a predetermined period of time and to send the obtained spatial position information of the second UAV to the relay UAV.

After the feeding back the acknowledgement based on the second beacon frame, the method further includes:
controlling the first UAV to obtain current spatial position information of the first UAV based on a predetermined period of time and to send the obtained spatial position information of the first UAV to the relay UAV.

After the sending the obtained spatial position information of the first UAV to the relay UAV, the method further includes:
if a distance between the first UAV and the second UAV is detected to reach a first predetermined distance, controlling the first UAV and the second UAV to move toward each other.

After the sending the obtained spatial position information of the first UAV to the relay UAV, the method further includes:
if a distance between the first UAV and the second UAV that move toward each other reaches a second predetermined distance, controlling the first UAV and the second UAV to move opposite to each other.

The method further includes:
if the first UAV malfunctions, sending geographic position information of the first UAV to the transmitting party.

Before the detecting whether the second UAV which establishes the connection with the transmitting party exists, the method further includes:
receiving a synchronization beacon frame sent by the transmitting party to synchronize with a clock of the transmitting party.

Based on above method, the present invention further provides a storage medium, which stores a plurality of instructions. The instructions are adaptive to be executed by a processor to execute the afore-described UAV control method.

A person of ordinary skill in the art may understand that all or some of the steps in various methods of the foregoing embodiments may be implemented by a program instructing relevant hardware. The program instructions may be stored in a computer readable storage medium. The storage medium may include a read only memory (ROM), a random access memory (RAM), a magnetic disk or an optic disc.

Figure 5:
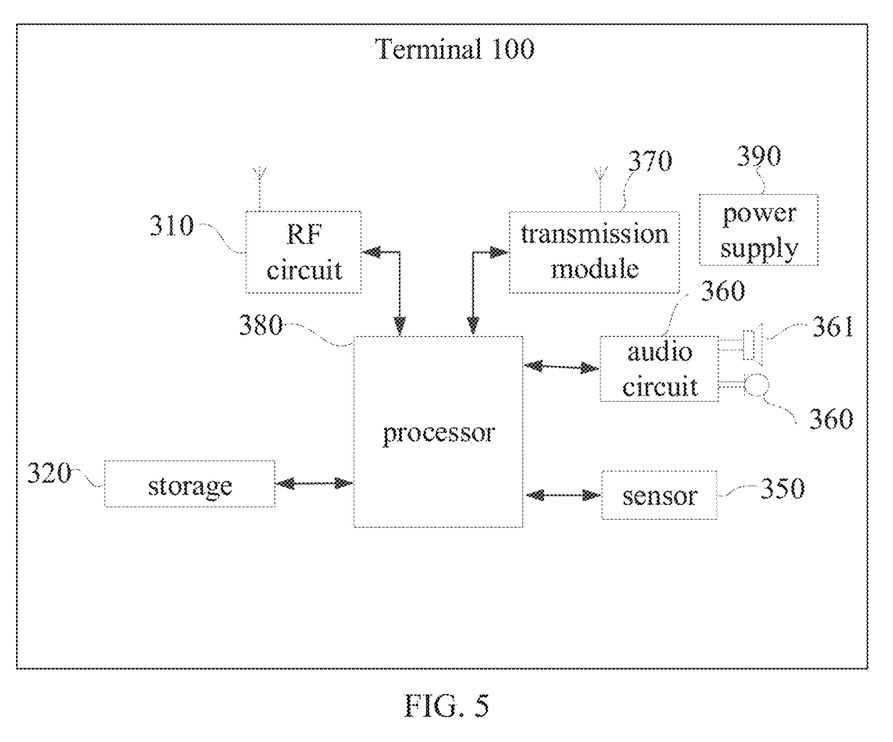
FIG. 5 is a structural block diagram showing a terminal provided in an embodiment of the present invention.

FIG. 5 is a structural block diagram showing a terminal provided in an embodiment of the present invention. The terminal can be utilized to implement the UAV control method, storage medium and terminal provided in above embodiments.

As shown in FIG. 5, the terminal 100 may include a radio frequency (RF) circuit 310, a storage 320 including one or more computer-readable storage media (a single one is merely illustrated in the drawings), a sensor 350, an audio circuit 360, a transmission module 370, a processor 380 including one or more processing cores (a single one is merely illustrated in the drawings), a power supply 390, etc. A person skilled in the art understands that the structure of the terminal 100 shown in FIG. 4 does not constitute a limitation to the terminal 100, and may include more or less components than those illustrated in the drawings. Furthermore, some components of the terminal 100 can be combined and/or arranged in different ways other than that shown in FIG. 5.

The RF circuit 310 may include various existing circuit components for executing the functions, for example, an antenna, an RF transceiver, a digital signal processor, an encryption/decryption chip, a storage, and so on. The RF circuit 310 can communicate with various networks, such as Internet, an intranet, or a wireless network, or can communicate with second devices via the wireless network. The above-mentioned wireless network may include a cellular network or a wireless local area network or metropolitan area network.

The storage 320 can be configured to store software programs and modules, such as the program instructions/modules corresponding to the UAV control method, device, storage medium and terminal in above-mentioned embodiments. The processor 380 can perform various applications of functions and data processing by executing the software programs and modules stored in the storage 320 to implement the chip identification function. The storage 320 may include high-speed random access memory, and may further include non-volatile memory such as one or more magnetic storage devices, flash memory, or other secondary non-volatile solid-state storages. In some embodiments, the storage 320 can implement the storage medium described above.

The terminal 100 may further include at least one sensor 350, such as a light sensor, a motion sensor, and secondary sensors. Specifically, the light sensor can include an ambient light sensor and a proximity sensor. The ambient light sensor can adjust the brightness of the display panel 341 according to bright or dark as to the ambient light. The proximity sensor can turn off the display panel 341 and/or the backlight when the terminal 100 is moved close to ears. As for the secondary sensors, the terminal 100 may also be equipped with a gyroscope, a barometer, a hygrometer, a thermometer, an infrared sensor, etc. Details for this are not repeated herein.

The audio circuit 360, a speaker 361, and a microphone 162 provide an audio interface between the user and the terminal 100. The audio circuit 360 converts received audio data to an electrical signal and transmits the electrical signal to the speaker 361. The speaker 361 converts the electrical signal to sound signals and outputs the sound signals. In addition, the microphone 362 converts collected sound signal to an electrical signal. The audio circuit 360 converts the electrical signal to audio data and transmits the audio data to the processor 380 for further processing. After the processing, the audio data may be transmitted to another terminal via the RF circuit 310, or transmitted to the storage 320 for further processing. The audio circuit 360 may further include an earphone jack for providing communication between an external earphone and the terminal 100.

The terminal 100 can be configured to, by the transmission module 370, help a user to send and receive emails, browse a webpage, and access to streaming media, and so on. It provides the user with wireless broadband Internet access.

The processor 380 functions as a control center of the terminal 100 and is configured to connect each component of the whole UAV using various interfaces and circuits, and is configured to execute the various functions of the terminal 100 and to perform data processing by running or executing the software programs and/or modules stored in the storage 320 and calling the data stored in the storage 320, thereby realizing overall monitoring over the UAV. Optionally, the processor 380 may include one or more processing cores. In some embodiments, an application processor and a modulation/demodulation processor can be integrated to form the processor 380. The application processor is primarily configured to process an operating system, user interfaces, application programs, and so on. The modulation/demodulation processor is primarily configured to process wireless communication. It should be understood that the modulation/demodulation processor can be independent from the processor 380.

Specifically, the processor 380 includes an Arithmetic Logic Unit (ALU), an application processor, a Global Positioning System (GPS) and a control and status bus (not shown in the drawings).

The terminal 100 further includes the power supply 390 (such as a battery) configured to provide power for the various components of the terminal 100. In some embodiments, the power supply can be logically coupled to the processor 380 via a power management system that controls charging, discharging, power consumption, and so on. The power supply 390 may further include one or more direct current (DC) or alternating current (AC) power sources, recharging system, power failure detection circuit, power converter or inverter, power supply status indicator, etc.

Although not being shown, the terminal 100 may include a camera (such as a front camera and a rear camera), a BLUETOOTH module, and so on. They are not repeated herein.

Specifically, in the present embodiment, the mobile terminal further includes the storage 320 and one or more programs. The one or more programs are stored in the storage 320. After configuration, one or more processors 380 execute the one or more programs, which include the following operating instructions:

feeding back a first access request to a transmitting party based on a first beacon frame to establish a connection with the transmitting party when the first beacon frame sent by the transmitting party is obtained in a scan, wherein the transmitting party is a ground master device or another relay UAV;

sending a second beacon frame and detecting whether a first UAV which feeds back a second access request based on the second beacon frame exists, wherein the first UAV is a UAV which has not established a connection with the transmitting party;

if the first UAV which feeds back the second access request based on the second beacon frame exists, feeding back an acknowledgement based on the second beacon frame to enable a connection between the first UAV and the transmitting party; and after receiving an action instruction sent by the transmitting party, sending the action instruction to the first UAV to enable the first UAV to execute an action corresponding to the action instruction.

In some embodiments, after the feeding back the first access request to the transmitting party based on the first beacon frame to establish the connection with the transmitting party, the processor 380 may further execute the following operating instructions:

detecting whether a second UAV which establishes a connection with the transmitting party exists;

if the second UAV which establishes the connection with the transmitting party is detected, controlling the second UAV to obtain current spatial position information of the second UAV based on a predetermined period of time and to send the obtained spatial position information of the second UAV to the relay UAV.

In some embodiments, after the feeding back the acknowledgement based on the second beacon frame, the processor 380 may further execute the following operating instructions:

controlling the first UAV to obtain current spatial position information of the first UAV based on a predetermined period of time and to send the obtained spatial position information of the first UAV to the relay UAV.

In some embodiments, after the sending the obtained spatial position information of the first UAV to the relay UAV, the processor 380 may further execute the following operating instructions:

if a distance between the first UAV and the second UAV is detected to reach a first predetermined distance, controlling the first UAV and the second UAV to move toward each other.

In some embodiments, after the sending the obtained spatial position information of the first UAV to the relay UAV, the processor 380 may further execute the following operating instructions:

if a distance between the first UAV and the second UAV that move toward each other reaches a second predetermined distance, controlling the first UAV and the second UAV to move opposite to each other.

In some embodiments, the processor 380 may further execute the following operating instructions:

if the first UAV malfunctions, sending geographic position information of the first UAV to the transmitting party.

In some embodiments, before the detecting whether the second UAV which establishes the connection with the transmitting party exists, the processor 380 may further execute the following operating instructions:

receiving a synchronization beacon frame sent by the transmitting party to synchronize with a clock of the transmitting party.

In the above embodiments, different emphasis is placed on respective embodiments, and reference may be made to related depictions in other embodiments for portions not detailed in a certain embodiment.

Hereinbefore, the UAV control method, device, storage medium and terminal provided in the embodiments of the present application are introduced in detail, the principles and implementations of the present application are set forth herein with reference to specific examples, descriptions of the above embodiments are merely served to assist in understanding the technical solutions and essential ideas of the present application. Those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present application.

What is claimed is:

1. An unmanned aerial vehicle (UAV) control method, applied to a relay UAV, the method comprising:

feeding back a first access request to a transmitting party based on a first beacon frame to establish a connection with the transmitting party when the first beacon frame sent by the transmitting party is obtained in a scan, wherein the transmitting party is a ground master device or another relay UAV;

sending a second beacon frame and detecting whether a first UAV which feeds back a second access request based on the second beacon frame exists, wherein the first UAV is a UAV which has not established a connection with the transmitting party;

if the first UAV which feeds back the second access request based on the second beacon frame exists, establishing a connection between the first UAV and the transmitting party;

controlling the first UAV to obtain current spatial position information of the first UAV based on a predetermined period of time; and after receiving an action instruction sent by the transmitting party, sending the action instruction to the first UAV to enable the first UAV to execute an action corresponding to the action instruction.

2. The UAV control method according to claim 1, wherein after the feeding back the first access request to the transmitting party based on the first beacon frame to establish the connection with the transmitting party, the method further comprises:

detecting whether a second UAV which establishes a connection with the transmitting party exists;

if the second UAV which establishes the connection with the transmitting party is detected, controlling the second UAV to obtain current spatial position information of the second UAV based on a predetermined period of time.

3. The UAV control method according to claim 2, further comprising:

if a distance between the first UAV and the second UAV is detected to reach a first predetermined distance, controlling the first UAV and the second UAV to move toward each other.

4. The UAV control method according to claim 3, further comprising:

if a distance between the first UAV and the second UAV that move toward each other reaches a second predetermined distance, controlling the first UAV and the second UAV to move opposite to each other.

5. The UAV control method according to claim 1, further comprising:

if the first UAV malfunctions, sending geographic position information of the first UAV to the transmitting party.

6. The UAV control method according to claim 2, wherein before the detecting whether the second UAV which establishes the connection with the transmitting party exists, the method further comprises:

receiving a synchronization beacon frame sent by the transmitting party to synchronize with a clock of the transmitting party.

7. An unmanned aerial vehicle (UAV) control device, comprising a processor and a memory, the memory storing a plurality of instructions that are executed by the processor to perform the steps of:

feeding back a first access request to a transmitting party based on a first beacon frame to establish a connection with the transmitting party when the first beacon frame sent by the transmitting party is obtained in a scan, wherein the transmitting party is a ground master device or another relay UAV;

sending a second beacon frame and detecting whether a first UAV which feeds back a second access request based on the second beacon frame exists, wherein the first UAV is a UAV which has not established a connection with the transmitting party;

establishing a connection between the first UAV and the transmitting party if the first UAV which feeds back the second access request based on the second beacon frame exists;

controlling the first UAV to obtain current spatial position information of the first UAV based on a predetermined period of time; and sending, after receiving an action instruction sent by the transmitting party, the action instruction to the first UAV to enable the first UAV to execute an action corresponding to the action instruction.

8. The UAV control device according to claim 7, wherein the instructions are performed by the processor to perform the steps of:

detecting whether a second UAV which establishes a connection with the transmitting party exists; and controlling, if the second UAV which establishes the connection with the transmitting party is detected, the second UAV to obtain current spatial position information of the second UAV based on a predetermined period of time.

9. A non-transitory storage medium, the storage medium stores a computer program, and when the computer program runs on a computer, the computer executes an unmanned aerial vehicle (UAV) control method, the method comprising:
   detecting whether a connection is established with another transmitting party when a first beacon frame sent by a transmitting party is obtained in a scan;
   if a connection has been established with the another transmitting party, ignoring the first beacon frame;
   if a connection is detected to be not established with the another transmitting party, feeding back a first access request to the transmitting party based on the first beacon frame to establish a connection with the transmitting party, wherein the transmitting party is a ground master device or another relay UAV;
   sending a second beacon frame and detecting whether a first UAV which feeds back a second access request based on the second beacon frame exists, wherein the first UAV is a UAV which has not established a connection with the transmitting party;
   if the first UAV which feeds back the second access request based on the second beacon frame exists, establishing a connection between the first UAV and the transmitting party;
   controlling the first UAV to obtain current spatial position information of the first UAV based on a predetermined period of time; and
   after receiving an action instruction sent by the transmitting party, sending the action instruction to the first UAV to enable the first UAV to execute an action corresponding to the action instruction.

10. The storage medium according to claim 9, wherein after the feeding back the first access request to the transmitting party based on the first beacon frame to establish the connection with the transmitting party, the method further comprises:
    detecting whether a second UAV which establishes a connection with the transmitting party exists;
    if the second UAV which establishes the connection with the transmitting party is detected, controlling the second UAV to obtain current spatial position information of the second UAV based on a predetermined period of time.

11. The storage medium according to claim 10, wherein after the sending the obtained spatial position information of the first UAV to the relay UAV, the method further comprises:
    if a distance between the first UAV and the second UAV is detected to reach a first predetermined distance, controlling the first UAV and the second UAV to move toward each other.

12. The storage medium according to claim 11, wherein after the sending the obtained spatial position information of the first UAV to the relay UAV, the method further comprises:
    if a distance between the first UAV and the second UAV that move toward each other reaches a second predetermined distance, controlling the first UAV and the second UAV to move opposite to each other.

13. The storage medium according to claim 9, wherein the method further comprises:
    if the first UAV malfunctions, sending geographic position information of the first UAV to the transmitting party.

14. The storage medium according to claim 10, wherein before the detecting whether the second UAV which establishes the connection with the transmitting party exists, the method further comprises:
    receiving a synchronization beacon frame sent by the transmitting party to synchronize with a clock of the transmitting party.

15. The UAV control device according to claim 8, wherein the instructions are performed by the processor to perform a step of:
    if a distance between the first UAV and the second UAV is detected to reach a first predetermined distance, controlling the first UAV and the second UAV to move toward each other.

16. The UAV control device according to claim 15, wherein the instructions are performed by the processor to perform a step of:
    if a distance between the first UAV and the second UAV that move toward each other reaches a second predetermined distance, controlling the first UAV and the second UAV to move opposite to each other.

17. The UAV control device according to claim 7, wherein the instructions are performed by the processor to perform a step of:
    if the first UAV malfunctions, sending geographic position information of the first UAV to the transmitting party.

18. The UAV control device according to claim 8, wherein before the detecting whether the second UAV which establishes the connection with the transmitting party exists, the instructions are performed by the processor to perform a step of:
    receiving a synchronization beacon frame sent by the transmitting party to synchronize with a clock of the transmitting party.

* * * * *